(12) United States Patent
Virgili et al.

(10) Patent No.: US 10,895,922 B2
(45) Date of Patent: Jan. 19, 2021

(54) FILM AND STYLUS SYSTEM FOR EMULATING PEN-ON-PAPER TACTILE FEEDBACK

(71) Applicant: Tactus Technology, Inc., Fremont, CA (US)

(72) Inventors: Justin Virgili, Fremont, CA (US); Micah Yairi, Fremont, CA (US); Curtis Takagi, San Jose, CA (US); Ryosuke Isobe, Westminster, CO (US); Brian Flamm, Los Altos Hills, CA (US)

(73) Assignee: Tactus Technology, Inc., Fremont, CA (US)

( * ) Notice: Subject to any disclaimer, the term of this patent is extended or adjusted under 35 U.S.C. 154(b) by 0 days.

(21) Appl. No.: 16/379,733

(22) Filed: Apr. 9, 2019

(65) Prior Publication Data

US 2019/0324566 A1    Oct. 24, 2019

Related U.S. Application Data

(63) Continuation-in-part of application No. 15/895,971, filed on Feb. 13, 2018, and a continuation-in-part of application No. 15/227,726, filed on Aug. 3, 2016, now abandoned.

(60) Provisional application No. 62/655,125, filed on Apr. 9, 2018, provisional application No. 62/458,458, filed on Feb. 13, 2017, provisional application No. 62/200,231, filed on Aug. 3, 2015.

(51) Int. Cl.
*G06F 3/01* (2006.01)
*G06F 3/041* (2006.01)
*G06F 3/0354* (2013.01)
*G06F 3/02* (2006.01)

(52) U.S. Cl.
CPC ............ *G06F 3/041* (2013.01); *G06F 3/0202* (2013.01); *G06F 3/03545* (2013.01)

(58) Field of Classification Search
CPC ..... G06F 3/0202; G06F 3/0412; A45C 11/00; C08F 290/067; H01Q 1/125; G02B 1/111
USPC .............. 206/45.24; 343/702; 345/173, 174; 359/361
See application file for complete search history.

(56) References Cited

U.S. PATENT DOCUMENTS

| | | | |
|---|---|---|---|
| 2003/0086159 A1* | 5/2003 | Suzuki | G02B 1/111 359/361 |
| 2008/0094292 A1* | 4/2008 | Su | H01Q 1/125 343/702 |
| 2013/0257759 A1* | 10/2013 | Daghigh | G06F 3/0412 345/173 |

(Continued)

*Primary Examiner* — Abdul-Samad A Adediran
(74) *Attorney, Agent, or Firm* — Run8 Patent Group, LLC; Alexander R. Flake; Peter Miller

(57) ABSTRACT

A feedback-enhancing film includes: an elastic layer comprising a first polymer exhibiting optical transparency and elasticity; and an interface layer arranged across an upper surface of the elastic layer comprising a second polymer exhibiting optical transparency, impact resistance, UV resistance, and smoothness to touch. Additionally, the interface layer and the elastic layer mutually deform to resist transverse movement of a stylus tip across the interface layer in response to an application of writing force to the interface layer via the stylus tip. The film can also comprise a system including: the film; a stylus including a stylus tip; and a touch-sensitive screen.

19 Claims, 5 Drawing Sheets

(56) References Cited

U.S. PATENT DOCUMENTS

2014/0160063 A1\* 6/2014 Yairi .................... G06F 3/0202
 345/174
2014/0262855 A1\* 9/2014 Gandhi ................. A45C 11/00
 206/45.24
2016/0328050 A1\* 11/2016 Shimosugi .......... C08F 290/067

\* cited by examiner (TOP DOWN VIEW)

(CROSS-SECTIONAL VIEW)

FILM AND STYLUS SYSTEM FOR EMULATING PEN-ON-PAPER TACTILE FEEDBACK

CROSS-REFERENCE TO RELATED APPLICATIONS

This application claims the benefit of U.S. Provisional Application No. 62/655,125, filed on 9 Apr. 2018, which is incorporated in its entirety by this reference.

This application is a continuation-in-part application of U.S. patent application Ser. No. 15/227,726, filed on 3 Aug. 2016, which claims the benefit of U.S. Provisional Application No. 62/200,231, filed on 3 Aug. 2015, both of which are incorporated in their entireties by this reference.

This application is a continuation-in-part application of U.S. patent application Ser. No. 15/895,971, filed on 13 Feb. 2018, which claims the benefit of U.S. Provisional Application No. 62/458,458, filed on 13 Feb. 2017, both of which are incorporated in their entireties by this reference.

TECHNICAL FIELD

This invention relates generally to the field of touch-sensitive interfaces, and more specifically to a system for emulating pen-on-paper tactile feedback in the field of touch-sensitive interfaces.

BACKGROUND

Enabled by the increased resolution and performance of capacitive touchscreens (and styluses capable of interacting with them) and by the emergence of the tablet market, consumers are increasingly demanding the fine precision and capability of interaction afforded only by the use of a stylus or other writing implement in conjunction with the ability to provide touch input to a screen interface.

However, stylus-capable touch interfaces of modern computing devices still resemble those of previous finger-centric devices. Often hard, slick, and formed of glass or glasslike material, these interfaces provide a stylus experience incapable of providing the same high accuracy and tactile feedback that consumers experience with pens or pencils on paper.

Manufacturers have attempted to address this issue by focusing on the stylus—manufacturing styluses with soft, deformable tips, which provides some improvements to feel, but at a significant cost to durability and accuracy.

The present application is directed to a system for enhancing stylus tactile feedback that provides stylus users with the feel of traditional writing without the accuracy tradeoffs taken by stylus manufacturers.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Feedback-Enhancing Film

Figure 1A:
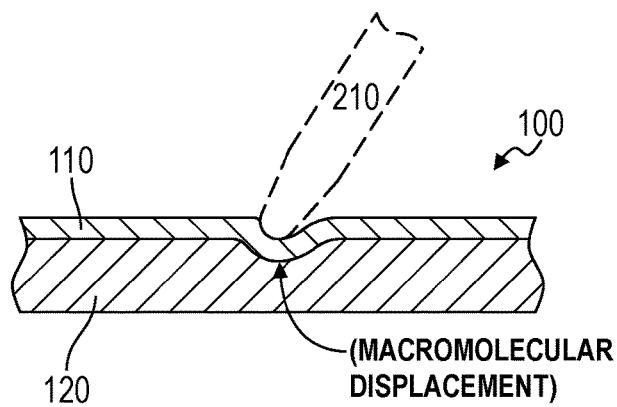
FIGS. 1A and 1B are schematic representations of a feedback-enhancing film.
Figure 1B:
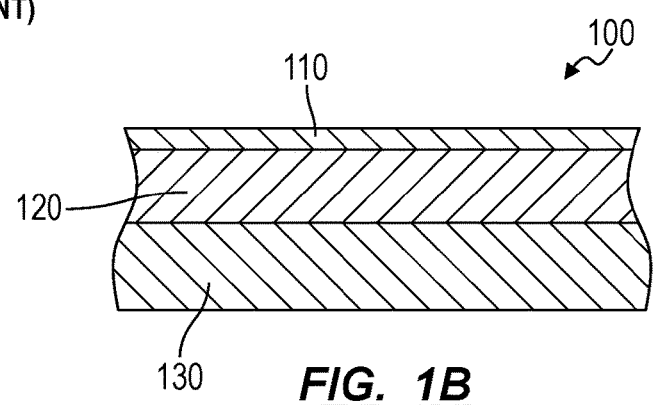

As shown in FIG. 1A, a feedback-enhancing film 100 (hereinafter "the film") includes an elastic layer 120, comprising a first polymer exhibiting optical transparency and elasticity; an interface layer 110 arranged across an upper surface of the elastic layer 120 comprising a second polymer exhibiting optical transparency, impact resistance, UV resistance, and smoothness to touch. Additionally, the interface layer 110 and the elastic layer 120 mutually deform to resist transverse movement of a stylus tip across the interface layer 110 in response to an application of writing force to the interface layer 110 via the stylus tip.

Figure 2A:
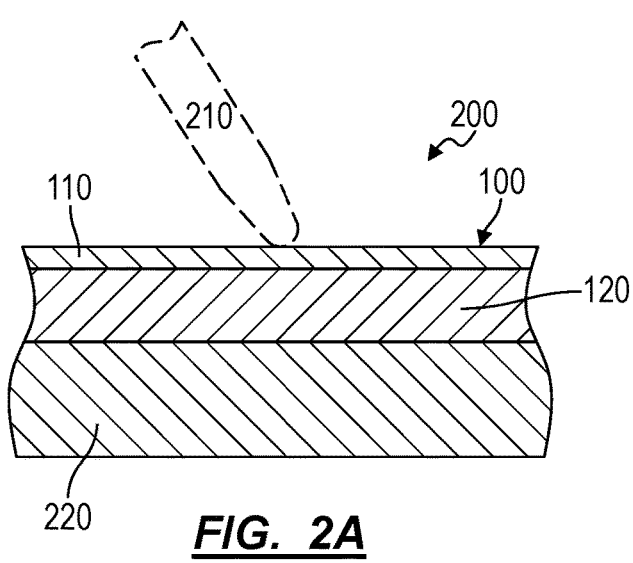
FIGS. 2A and 2B are schematic representations of a touch-sensitive system including the feedback-enhancing film.
Figure 2B:
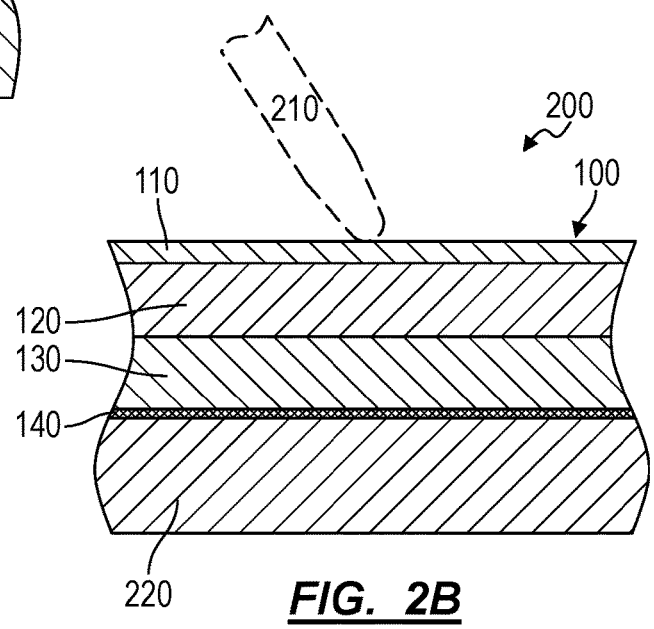

As shown in FIG. 2A the film 100 can also comprise a system 200 including: the film 100; a stylus 210 including a stylus tip; and a touch-sensitive screen. Additionally, the interface layer 110 and the elastic layer 120 mutually deform to resist transverse movement of the stylus tip across the interface layer 110 in response to an application of writing force to the interface layer 110 via the stylus tip.

2. Applications

Generally, the film 100 is a multilayer film including an elastic layer 120 and an interface layer 110 and is configured to interact with a stylus 210 and/or human fingers as part of a system 200 for enhancing stylus 210 tactile feedback while maintaining the expected optical transparency/clarity, durability, and touch sensitivity/feel of a typical capacitive and/or resistive touchscreen installed on a mobile computing device (e.g., a smartphone or tablet). When a typical writing force (e.g., 0.5 to 3.0 Newtons) is applied to the film 100 by a user via the stylus 210, the film 100 emulates the tactile feeling of writing with a pen on paper by exhibiting similar deformation characteristics and a similar dynamic coefficient of friction to those exhibited by several sheets of paper when written on by a pen. In particular, the interface layer 110 functions as a protective and visually appealing top layer to prevent damage (e.g., mechanical or UV) to the underlying elastic layer 120 or touch screen while also being able to macromolecularly deform under pressure without separating from the elastic layer 120. The elastic layer 120 more accurately mimics the deformation characteristics of multiple sheets of paper. Thus, by including a protective interface layer 110, the film 100 enables the selection of materials for the elastic layer 120 that can be more finely tuned to the mechanical properties of paper but may not be sufficiently stable, durable, or visually appealing to function as a single-layer film for a touchscreen display. Furthermore, by more accurately mimicking the macromolecular deformation that occurs around a pen when applied to paper, the film 100 also enables the inclusion of a stylus 210 with a small tip diameter (e.g., 1.5 millimeters), which further improves writing precision for the user and facilitates accurate detection of the stylus 210 by an underlying touchscreen.

Figure 5:
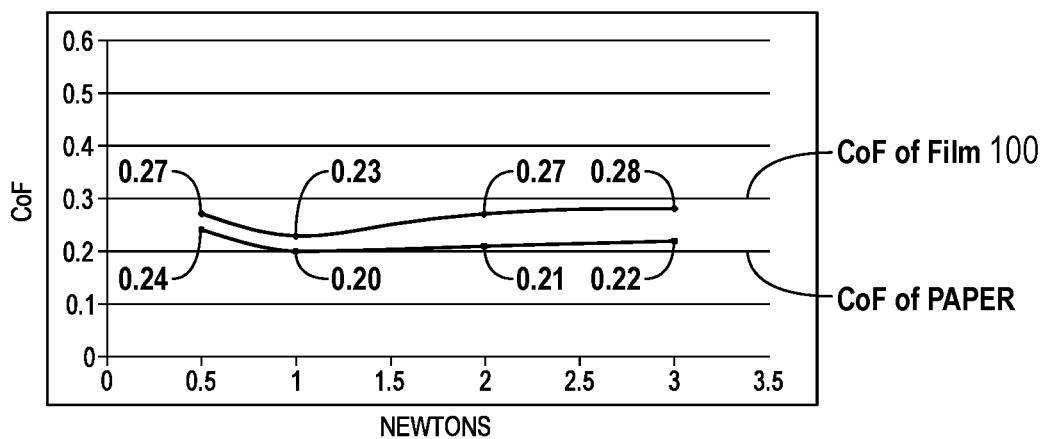
FIG. 5 is a graphical representation of the dynamic coefficient of friction of the feedback-enhancing film over a range writing forces.

More specifically, the film 100 exhibits significantly different deformation and surface friction characteristics in response to an application of localized force (e.g., such as via tip of a stylus 210) versus an application of distributed force (e.g., via a touch of a finger). This property is an emergent quality of careful tuning of the relative elasticity of each layer and the relative thickness of each layer, wherein the elastic layer 120 is thicker (e.g., 60%-80% of the total thickness of the film 100) and more elastic than the interface layer 110, while the interface layer 110 is thin enough to deform to the same degree as the elastic layer 120 while exhibiting surface hardness and smoothness (e.g., substantially similar to glass). The film 100 can exhibit elastic deformation characteristics through at least 10% engineering strain of the film 100, thereby exhibiting consistent elastic recovery upon indentation by the stylus 210 (e.g., an indentation of 30 to 60 micrometers). Additionally, at 10% engineering strain and during the application of typical writing force, the film 100 exhibits a dynamic coefficient of friction of between 0.2 and 0.3 (indicating a friction force equal to 20%-30% of the normal force applied via the stylus 210). These characteristics are similar to those exhibited by several sheets of paper when pressed upon by the tip of a ballpoint pen, as shown in FIG. 5. However, as is further described below, the film 100 can also be tuned to mimic a pencil-on-paper feel with the addition of subsurface texturing or suspended particles within the film 100.

The film 100 exhibits durability on par with similar polymer touchscreen coatings despite being capable of repeated deformation by a stylus 210 due to tuning of the elastic recovery rate of the interface layer 110 relative to the elastic recovery rate of the elastic layer 120. Although, the interface layer 110 and the elastic layer 120 differ in elasticity and thickness, the elastic layer 120 can exhibit an elastic recovery rate equal to or greater than the elastic recovery rate of the interface layer 110, thereby preventing separation of the interface layer 110 from the elastic layer 120. Additionally, a specialized manufacturing method S100 of the film 100 further improves the film's durability by chemically crosslinking the interface layer 110 to the elastic layer 120 during curing of the interface layer 110.

Although the composition of the interface layer 110 and the composition of the elastic layer 120 can vary depending on the desired tactile feedback from the film 100, the film 100 can include an elastic layer 120 composed of a soft, optically-clear polymer characterized by elastic and/or viscoelastic properties and an interface layer 110 composed of a medium durometer polymer with a smooth surface finish, UV resistance, and the ability to crosslink with the polymer of the elastic layer 120. In one implementation, the elastic layer 120 includes an optically-clear polyurethane cast elastomer, while the interface layer 110 includes a self-healing, optically-clear acrylic polyurethane cast elastomer. In a second implementation, the elastic layer 120 includes an optically-clear thermoplastic polyurethane, while the interface layer 110 includes a self-healing, optically-clear acrylic polyurethane cast elastomer.

3. Example

In one example implementation of the film 100, the film 100 is included in a touchscreen and stylus system 200, which can be installed on a mobile computing device. Upon visual examination of the touchscreen 220 on the mobile computing device, a user may notice no significant difference in the appearance of the touchscreen 220, which has a similar optical clarity and gloss to a normal touchscreen. The user may then interact with the touchscreen 220 using their fingers and perceive a smooth tactile surface with minimal deformation under load. However, upon applying writing force (e.g., a concentrated/localized force) to the surface of the touch screen, the user may experience a slight depression of the stylus 210 into the film 100 and a drag force resisting transverse motion of the stylus 210 across the film 100. Thus, a touchscreen and stylus system 200 including the film 100 can provide desired tactile feedback through touch and through a stylus 210 feedback.

4. Interface Layer

Generally, the film 100 includes an interface layer 110 including a polymer exhibiting optical transparency, impact resistance, UV resistance, and smoothness to touch. The film 100 includes an interface layer 110 that: presents a smooth tactile surface to a user of touchscreen underlying the film 100; provides a glossy surface finish consistent with typical hard coatings for touchscreens; and provides impact, abrasion, and UV resistance to the elastic layer 120 and underlying touchscreen. Additionally, the interface layer 110 minimally deforms in response to distributed force applied over a larger area of the film (e.g., in response to touch or press of a finger over an area on the order of a square centimeter) but elastically deforms in response to localized force applied over a smaller area (e.g., in response to writing force applied to the film 100 via a stylus 210 over an area on the order of a square millimeter). Thus, the interface layer 110 is characterized by a low surface roughness (e.g., comparable to tempered glass), a low static/kinetic coefficient of friction, and a medium durometer/hardness and an elastic modulus higher than an elastic modulus of the elastic layer 120.

The film 100 can include an interface layer 110 with a surface roughness similar to tempered glass, which contributes to the desired surface friction and surface gloss characteristics of the interface layer 110. In one implementation, the surface roughness of the interface layer 110 is less than 0.15 micrometers Ra root-mean-squared (hereinafter "RMS").

The interface layer 110 includes a polymer with a greater durometer/hardness and elastic modulus when compared to the elastic layer 120. The interface layer 110 can therefore include polymers such as polyurethanes with higher cross-linking densities and shorter polyol chains. In one implementation the interface layer 110 includes a self-healing (e.g., at room temperature) acrylic polyurethane.

Because the interface layer 110 deforms to the same extent as the elastic layer 120, which has a lesser elastic modulus, the film 100 includes an interface layer 110 with a thickness less than the thickness of the elastic layer 120. In one implementation, the film includes an interface layer 110 that comprises 10%-35% of the overall thickness of the film 100. Typically, in order for an underlying (capacitive) touch screen to function, the film 100 is characterized by a thickness between 50 and 200 micrometers. Therefore, the film 100 can include an interface layer 110 characterized by a thickness between 5 and 70 micrometers. In one implementation, the interface layer 110 is characterized by a thickness of 25 micrometers and the elastic layer 120 is characterized by a thickness of 50 micrometers. In a second implementation, the interface layer 110 is characterized by a thickness of 25 micrometers and the elastic layer 120 is characterized by a thickness of 75 micrometers.

In one implementation, the interface layer 110 includes an oleophobic coating applied over the tactile surface of the interface layer 110 to prevent fingerprinting on the tactile surface of the interface layer 110.

4.1 Interface Layer Composition

The film 100 can include an interface layer 110 with properties tuned such that, upon an application of writing force the film 100 exhibits a dynamic coefficient of friction similar to a ball-point pen writing on four sheets of paper. The interface layer 110 can include a polyurethane chemistry characterized by an acrylic polyol, as a primary polyol and an aliphatic isocyanate (hereinafter "antiscratch coating" or "ASC"). The film 100 including ASC in the interface layer 100 can exhibit significantly increased dynamic coefficient of friction when compared to coated glass, as shown in TABLE 1 Example 6. However, various compositional characteristics of the interface layer 110 can be further adjusted in order to better achieve the abovementioned film properties. More specifically, the properties of the interface layer 110 can be modified: by adjusting the stoichiometric ratio of aliphatic isocyanate groups to isocyanate-reactive groups (hereinafter "stoichiometric ratio" of "[NCO/OH]"); by modifying the polyol chemistry of the thermoplastic polyurethane; or by adding reactive fluoropolymer additives.

In one implementation, the film 100 includes an interface layer 110 characterized by a stoichiometric ratio between 0.8 and 1.6, which results in a dynamic coefficient of friction between 0.13 and 0.20, as shown in TABLE 1 Examples 1-3. Thus, the film 100 can approximate the dynamic coefficient of friction exhibited by a ball point pen on four sheets of paper, as shown in TABLE 1 Example 7.

In a second implementation, the interface layer 110 can include a secondary polyol with a non-acrylic backbone comprised of a polyether, polyester, or polycarbonate mixed with the primary acrylic polyol to reduce the dynamic coefficient of friction (as shown in TABLE 1, Example 4).

In a third implementation, the interface layer 110 can include a fluoropolymer additive containing at least one isocyanate-reactive functional group is mixed with the acrylic polyol, such as trimethylolpropane (TMP) or ethoxylated TMP to modify the dynamic coefficient of friction (as shown in TABLE 1, Example 5). Therefore, the interface layer 110 can include reactive fluoropolymer additives, such as fluoroethylene/alkyl vinyl ether copolymers, perfluoropolyethers, polyvinylidene fluoride, tetrafluoroethylene copolymer, polyhexafluoropropylene, polytetrafluoroethylene and combinations thereof. Furthermore, in implementations of the interface layer 110 including a reactive fluoropolymer additive, the reactive fluoropolymer additive can be modified to include at least one isocyanate-reactive functional group. The dynamic coefficient of friction was measured using the amount of indentation experienced for a 1.9 mm diameter POM stylus, 20 mm/s tip speed, and 300 gram-force specific writing force using a customized friction testing instrument. TABLE 1 indicates the dynamic coefficient of friction of exemplary interface layer compositions as a component in the film 100 measured with a 1.9 mm diameter POM stylus oriented perpendicular (90°) to the interface layer 110 using a 20 mm/s tip speed and 300 g force. Measurements were recorded using a customized friction testing instrument comprised of an Instron 5942 equipped with a 10N load cell and low friction rail system. In all cases, the Interface and Elastic layer thicknesses are 25 and 75 um, respectively.

| Example | Interface Layer Composition | Surface Roughness ($R_a$, nm) | Dynamic Coefficient of Friction |
|---|---|---|---|
| 1 | ASC 1.6 [NCO/OH] | 31 ± 2 | 0.20 ± 0.01 |
| 2 | ASC 1.4 [NCO/OH] | 29 ± 3 | 0.15 ± 0.01 |
| 3 | ASC 0.8 [NCO/OH] | 27 ± 2 | 0.13 ± 0.01 |
| 4 | ASC w/ 2.3% polycarbonate polyol | 31 ± 5 | 0.08 ± 0.01 |
| 5 | ASC w/ 2.2% tetrafluoroethylene additive | 27 ± 3 | 0.09 ± 0.01 |
| 6 | Anti-fingerprint coated glass (comparative) | n.d. | 0.04 ± 0.01 |
| 7 | 4 stacked sheets 20# paper (comparative) | 1724 ± 133 | 0.23 ± 0.01* |

*Measured using ball point pen in place of a stylus.

5. Elastic Layer

Generally, the film 100 includes an elastic layer 120 including a polymer exhibiting elasticity and optical transparency that replicates the feeling of writing with a pen on several sheets of paper. The elastic layer 120 can exhibit an elastic modulus such that the elastic layer 120 (and therefore the film 100 as a whole) deforms by 10% to 20% strain and experiences elastic deformation throughout this intended deformation range. Additionally, the elastic layer 120 is characterized by a thickness that is 65%-90% of the total thickness of the film 100. Thus, the elastic layer 120 can deform significantly when force is applied by the stylus 210 while distributing the force across the underlying touchscreen thereby preventing damage to the touchscreen 220.

In one implementation, the film 100 includes an elastic layer 120 of a low durometer polyurethane. However, the elastic layer 120 can be manufactured from any polymer composition that exhibits the appropriate elastic and optical properties described herein.

Furthermore, the elastic layer 120 is configured to exhibit an elastic recovery rate equal to or greater than the elastic recovery rate of the interface layer 110. Therefore, the force of a stylus 210 mutually deforms the interface layer 110 and the elastic layer 120 downward and, upon removal of the stylus 210 from the film 100, the interface layer 110 does not retract upward from the elastic layer 120. Instead the elastic layer 120 can function to push the interface layer 110 upward, preventing delamination of the elastic layer 120 from the interface layer 110.

5.1 Elastic Layer Composition

The film 100 can include an elastic layer 120 with properties tuned such that, upon an application of writing force the film 100 exhibits a dynamic coefficient of friction similar to a ball-point pen writing on four sheets of paper. More specifically, dynamic coefficient of friction of the film 100 can be modified: by adjusting hardness of the elastic layer 120; and by modifying the thickness of the elastic layer 120.

In one implementation, the elastic layer 120 is composed of a thermoplastic polyurethane (TPU), which can be obtained via the reaction of polyisocyanates, polyols, and optional chain extenders. Non-limiting examples of suitable polyisocyanates include aliphatic isocyanates, such as hexamethylene diisocyanate (HDI), isophorone diisocyanate (IPDI), or hydrogenated methylene diphenyl diisocyanate (H12MDI), or aromatic isocyanates, including methylene diphenyl diisocyanate (MDI), or toluene diisocyanate (TDI). Non-limiting examples of suitable polyols include polyether, polyester, or polycarbonate polyols. Non-limiting examples of suitable chain extenders include diols (ethylene glycol, diethylene glycol, alkane diols, such as 1,4-butanediol and 1,6-hexanediol, and aromatic diols, such as hydroquinone bis(2-hydroxylethyl) ether) and diamines (tetramethylene diamine and hexamethylene diamine).

The elasticity of the interface layer 110 and elastic layer 120 is characterized using Dynamic Mechanical Analysis (Mettler Toledo DMA1, 1 Hz @0.1N in tension, 2° C./min). The elasticity of single layers is given by the glass transition temperature ($T_g$) determined using peak tan delta and the value of tan delta at 20° C. ($td_{T=20° C.}$). The similarity of the elastic recovery rates of the interface layer 110 and elastic layer 120 is parameterized by $\Delta T_g$ ($T_{g,Interface} - T_{g,Elastic}$) and the ratio of the interface layer and elastic layer's $td_{T=20° C.}$, $R_{td, 20° C.}$ ($td_{interface}/td_{Elastic}$). In implementations of the film 100 exhibiting commensurate elastic recovery rates in the interface layer 110 and the elastic layer 120 are characterized by a $\Delta T_g$ wherein $0° C. \leq \Delta T_g \leq 50° C.$ and $R_{td, 20° C.}$ wherein $0.1 \leq R_{td, 20° C.} \leq 2.5$. The dynamic coefficient of friction was measured using a 1.9 mm diameter POM stylus oriented perpendicular (90°) to the Interface Layer using a 100 mm/s tip speed and 300 g force. Measurements were recorded using a Nanovea T50 Tribometer.

As shown in TABLE 2, by modifying the thickness and durometer hardness of the elastic layer 120 characteristics of the film 100 can be tuned in order to exhibit a desired $\Delta T_g$ (between 0° C. and 50° C.), a desired $R_{td, 20° C.}$ (between 0.1 and 2.5); and a desired dynamic coefficient of friction that is sufficiently similar to the dynamic coefficient of friction exhibited by a pen on paper.

TABLE 2 indicates the dynamic coefficient of friction of exemplary elastic layer compositions as a component in the film 100. In all cases, the interface layer thickness is 25 um and the film structure includes a PET substrate layer 130 (50 um) and adhesive layer 140 (20 um). Films were laminated to soda lime glass prior to measurement.

generally undesirable viscoelastic properties the substrate layer 130 can provide the film 100 with consistent mechanical properties independent of the touchscreen to which the film 100 is adhered. In one implementation, the substrate layer 130 is composed of polyethylene terephthalate (hereinafter "PET").

7. Adhesive Layer

The film can include an adhesive layer 140 attaching the substrate layer 130 to the touchscreen 220. In one implementation, the adhesive layer 140 is composed of an optically clear adhesive, thereby maintaining the optical properties of the film and preventing aberration of images displayed by the touchscreen 220. Alternatively, the film 100 can include a self-wetting adhesive as the adhesive layer 140.

8. Film Mechanics

The combination of the elastic layer 120 and the interface layer 110 provide the film 100 with properties that are substantially similar to the transverse "drag" or resistive force of paper to a writing force (e.g., between 0.5 Newtons and 3.0 Newtons) applied normal to the surface of the paper. In particular, the film 100, in response to the application of writing force from stylus 210, exhibits an indentation creating "pile-ups" of film material on either side of the indentation. Subsequently, upon translation of the stylus 210 across the surface of the film 100, the film 100 exhibits a resistive force to the motion of the stylus 210 via macromolecular displacement of a "pile-up" on one side of the indentation across the surface of the film 100. Thus, in order to exhibit pen-on-paper feel, the film 100 can indent by up to 20% of its initial thickness under 3 Newtons of writing force (e.g., 20 to 80 micrometers depending on the total thickness of the film 100).

Tests have indicated that the just-noticeable difference in dynamic coefficient of friction for human users is ±0.03. Thus, the film 100 exhibits a dynamic coefficient of friction that is "similar" to paper if the film 100 exhibits a dynamic coefficient of friction within 0.03 of paper under comparable testing conditions. However, in some implementations, the

| Example | Elastic Layer Durometer Hardness | Elastic Layer Thickness (um) | $T_g$ (° C.) | $\Delta T_g$ (° C.) | $td_{T=20° C.}$ | $R_{td, 20° C.}$ | Dynamic Coefficient of Friction |
|---|---|---|---|---|---|---|---|
| 1 | 78A | 50 | −18 | 50 | 0.10 | 2.5 | 0.17 ± 0.01 |
| 2 | 80A | 40 | 19 | 13 | 1.20 | 0.2 | 0.23 ± 0.01 |
| 3 | 54D | 40 | 32 | 0 | 0.25 | 1.0 | 0.17 ± 0.01 |
| 4 | PET only (comparative) | n/a | 81 | −49 | $10^{-2}$ | 12.5 | n/a |
| 5 | ASC only (comparative) | n/a | 32 | n/a | 0.25 | n/a | 0.13 ± 0.01 |
| 6 | 4 stacked sheets 20# paper (comparative) | n/a | — | n/a | — | n/a | 0.22 ± 0.01* |

*Measured using ball point pen in place of a stylus.

6. Substrate Layer

The film can include a substrate layer 130, which functions as a supportive backing for the film 100 in order to maintain the desired pen-on-paper feel of the film 100 by separating the elastic layer 120 from the adhesive layer 140 that attaches the film 100 to the touchscreen 220. Because the adhesive layer 140 typically has a soft durometer and film 100 can exhibit a dynamic coefficient different than the dynamic coefficient of friction exhibited by paper in order to comply with user preferences for a touchscreen device.

The force resulting from the elasticity of the film can be characterized as the dynamic coefficient of friction, which is expressed as a ratio of normal force applied to the film 100 to the transverse/resistive force generated by the film 100. As is indicated in FIG. 5, the film 100 can resist transverse movement of the stylus tip across the interface layer 110 according to a dynamic coefficient of friction between 0.2 and 0.3 for the writing forces indicated. The dynamic coefficient of friction exhibited by the film 100 can be between the dynamic coefficient of friction exhibited by two sheets of paper and four sheets of paper at all levels of writing force. Furthermore, the dynamic coefficient of friction for any material can vary based on the applied writing force (e.g., as a function of the writing force). In one implementation, the film 100 exhibits a dynamic coefficient of friction curve of similar to a dynamic coefficient of friction curve for a ball-point pen applied to four sheets of paper. The similarity between the dynamic coefficient of friction curves is shown in FIG. 5. In on implementation, the film 100 exhibits a dynamic coefficient of friction greater than that of paper at normal applied writing forces between 0.5 Newtons and 3 Newtons In one implementation, the film 100 can exhibit a shear-thickening property, wherein the dynamic coefficient of friction of the film 100 increases as the normal force incident to the film 100 increases. the film 100 can also resist transverse movement of the stylus tip across the interface layer 110 according to a dynamic coefficient of friction between 0.22 and 0.26 in response to an application of 1.0 Newton and resist transverse movement of the stylus tip across the interface layer 110 according to a dynamic coefficient of friction between 0.26 and 0.30 in response to application of 3.0 Newtons.

Furthermore, the film 100 can be adapted to exhibit the above properties in response to the application of writing force via a stylus 210 of a particular size and or shape. In one implementation, the film 100 can resist transverse movement of a 1.5-millimeter stylus tip across the interface layer 110 according to a dynamic coefficient of friction between 0.2 and 0.3 in response to an application of writing force to the interface layer 110 via the stylus tip.

The relationship between the elastic layer 120 and the interface layer 110 that enables the abovementioned properties can be parameterized by the peak tan delta ratio, $R_{td, 20°\ C.}$, between the interface layer 110 and the elastic layer 120. $R_{td, 20°\ C.}$ compares the viscoelastic response of the interface layer 110 to the viscoelastic response of the elastic layer 120. In one implementation, the film 100 is characterized by $R_{td, 20°\ C.}$ less than 2.5. Alternatively, the film 100 is characterized by $R_{td, 20°\ C.}$ less than 1.

9. Layer Texturing

Figure 3A:
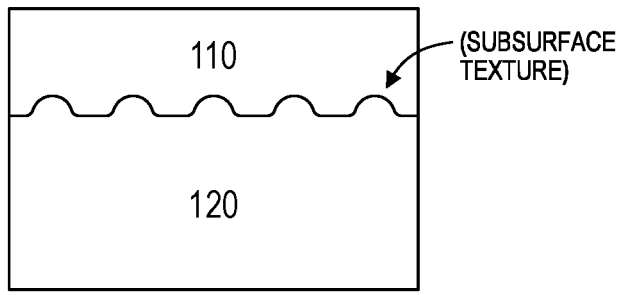
FIGS. 3A and 3B are schematic representations of variations of the feedback-enhancing film.
Figure 3A:
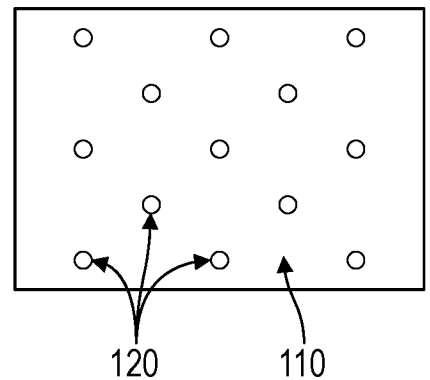

In one variation, shown in FIG. 3A, the film 100 includes an elastic layer 120 including a textured upper surface, while the interface layer 110 includes a smooth tactile surface that is exposed to the fingers of the user. Therefore, the "subsurface" texture of the film may only be noticeable to the user via tactile feedback through the stylus 210 while applying a writing force to the film 100. This texturing can provide a grainy feel to the user when the user applies a writing force to the film 100 in order to better mimic a pen-on-paper feel or a pencil-on-paper feel. The subsurface texture of the elastic layer 120 can include an applied surface roughness. Alternatively, the subsurface texture can define a grid of larger bumps (e.g., 5 micrometers in height) arranged across the surface of the elastic layer 120. Furthermore, the subsurface bumps can be spaced proportional the tip diameter of the stylus 210, causing the stylus 210 to perturb vertically as it translates across the film 100.

Figure 3B:
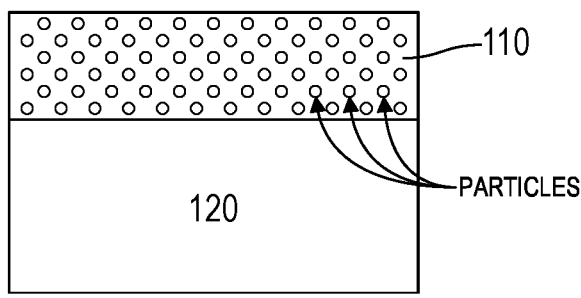
Figure 3B:
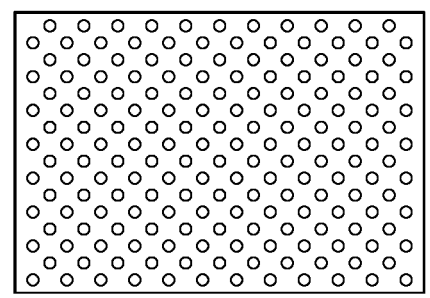

In another variation, shown in FIG. 3B, the film 100 includes a distribution of microparticles (e.g., on the order of micrometers in diameters) or nanoparticles (e.g. on the order of nanometers in diameter) suspended within the interface layer 110 or between the interface layer 110 and the elastic layer 120, thereby causing the film 100 to exhibit a grainy feel approximating dynamic friction forces caused by the surface roughness of paper as a pen or pencil is drawn across it. In one implementation, the microparticles are manufactured from a hard polymer or inorganic compound that provides noticeable disruption to the elastic characteristics of the interface layer 110, thereby causing perturbations in the tactile feedback experienced by the user.

In a second implementation, the microparticles are comprised of a hard polymer. For example, the interface layer can include 0.1 to 5% (w/w) of Ultra High Molecular Weight Polyethylene (UHMWPE) microparticles suspended within the interface layer 110 (TABLE 3, Examples 3 and 4). The UHMWPE microparticles possess a mean particle size of 3.5 micrometers and a particle size range of 2 to 7 micrometers as determined by dynamic light scattering.

TABLE 3

| In all cases, the film structure is comprised of a PET Substrate Layer (50 um) and Adhesive Layer (25 um) laminated to soda lime glass prior to measurement. | | | | | | |
|---|---|---|---|---|---|---|
| Example | Microparticle Loading (Interface Layer) | Interface Layer Thickness (um) | Elastic Layer Durometer Hardness | Elastic Layer Thickness (um) | Surface Roughness ($R_a$, nm) | Dynamic Coefficient of Friction |
| 1 | 0 | 25 | PET (substrate) | n/a | 24 ± 2 | 0.12 ± 0.01 |
| 2 | 0 | 25 | 78 | 50 | 22 ± 3 | 0.16 ± 0.01 |
| 3 | 2% | 30 | PET (substrate) | n/a | 44 ± 5 | 0.15 ± 0.01 |
| 4 | 3% | 41 | 78 | 50 | 50 ± 5 | 0.18 ± 0.01 |

Additionally, the suspended nanoparticles or microparticles can exhibit the same or similar index of refraction to the interface layer 110 and/or the elastic layer 120.

10. Layer Patterning

Figure 4A:
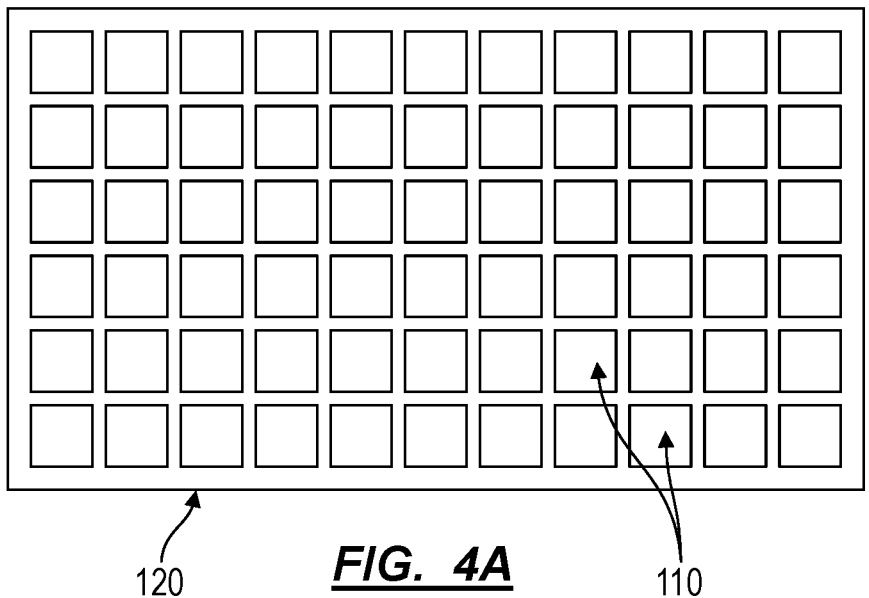
FIGS. 4A and 4B are schematic representations of variations of the feedback-enhancing film.
Figure 4B:
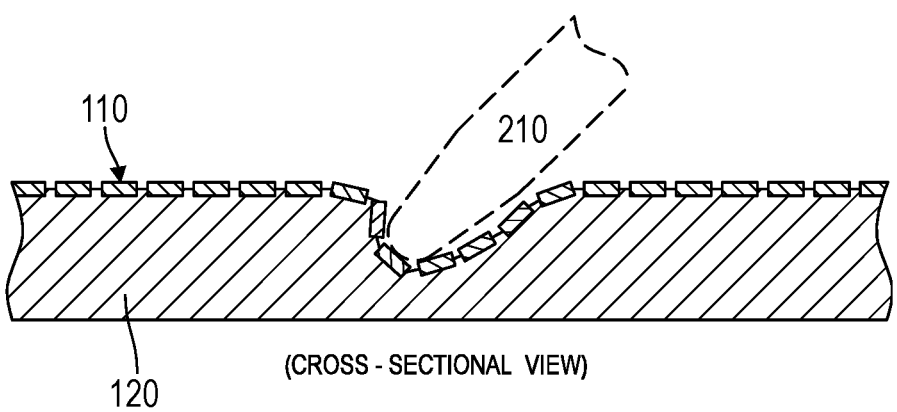

In one implementation, the film 100 includes an elastic layer 120 that defines a continuous layer; and an interface layer 110 that defines a set of discontinuous regions across the elastic layer 120. Additionally, the film 100 can include an interface layer 110 that defines a set of discontinuous regions across the elastic layer 120, wherein the set of discontinuous regions: spans an area less than 1 square millimeter; and is separated from an adjacent discontinuous region by a distance greater than 10 micrometers. The interface layer 110 can be spatially patterned to result in thinner film areas or even in discontinuities in the interface layer 110, as shown in FIGS. 4A and 4B. This can enable the film 100 to include an interface layer 110 characterized by increased hardness and/or elastic modulus while still allowing substantial deformation in response to writing force applied via a stylus 210. Thus, the interface layer 110 can include a set of sub-sections that are preferably small enough to enable deformation around the contour of a stylus tip (e.g., <1 mm^2). Likewise, the gap between sections is preferably large enough to enable deformation, but small enough to not have a substantial effect on friction (e.g., due to the stylus 210 running over ridges); for example, 10-100 microns.

The interface layer 110 (or any other layer of the film 100) may be patterned, divided, shaped, or otherwise structured in any manner.

11. Optical Properties

The film 100 is optically transparent and therefore includes two optically transparent layers. Additionally, to prevent optical aberration of an image displayed on the underlying touch screen, the film 100 can include an interface layer 110 and an elastic layer 120 with substantially the same index of refraction. Therefore, the film 100 does not cause reflection and/or distortion of the underlying image.

12. UV Resistance

The film 100 also exhibits resistance to UV degradation over time as a result of its two-layer structure. In many implementations, polymers exhibiting desired mechanical properties for the elastic layer 120 exhibit yellowing in the presence of UV light. Thus, the interface layer 110 can function to block incident UV light to the film 100 and prevent yellowing of the elastic layer 120, thereby expanding potential material choices for the elastic layer 120 composition

13. Hardness/Durability

The film 100 exhibits hardness and durability, which can be characterized according to a variety metrics including Shore hardness, tensile strength at 50% engineering strain, and/or tensile set.

In a first example of layer characterization, the film 100 is characterized by Shore hardness. In this example, the interface layer 110 is preferably of a hardness of 80 Shore A to 75 Shore D, more preferably of a hardness of 85 Shore A to 65 Shore D, and most preferably of a hardness of 90 Shore A to 60 Shore D; while the elastic layer 120 is preferably of a hardness of 60 Shore A to 65 Shore D, more preferably of a hardness of 75 Shore A to 55 Shore D, and most preferably of a hardness of 80 Shore A to 50 Shore D. Further, the interface layer 110 is preferably of greater hardness than the elastic layer 120. Alternatively, the layers of the film 100 may be of any hardness.

In a second example of layer characterization, the film 100 is characterized by tensile strength at 50% strain (as measured according to ASTM D638 using a Type V sample geometry). In this example, the interface layer 110 is preferably of a tensile strength of 5 to 15 MPa, more preferably of a tensile strength of 5 to 10 MPa, and most preferably of a tensile strength of 5 to 8 MPa; while the elastic layer 120 is preferably of a tensile strength of 1 to 10 MPa, more preferably of a tensile strength of 1 to 5 MPa, and most preferably of a tensile strength of 2 to 4 MPa. Further, the interface layer 110 is preferably of greater tensile strength than the elastic layer 120. Alternatively, the layers of the film 100 may be of any tensile strength.

In a third example of layer characterization, the film 100 is characterized by tensile set at 50% engineering strain (as measured according to ASTM D638 using a Type V sample geometry). In this example, the interface layer 110 is preferably of a tensile set of 0 to 25%, more preferably of a tensile set of 0 to 15%, and most preferably of a tensile set of 0 to 8%; while the elastic layer 120 is preferably of a tensile set of 0 to 20%, more preferably of a tensile set of 0 to 10%, and most preferably of a tensile set of 0 to 5%. Further, the interface layer 110 is preferably of greater tensile set than the elastic layer 120. Alternatively, the layers of the film 100 may be of any tensile set.

14. Stylus

The stylus 210 of the system 200 can include any stylus 210 capable of interacting with a touch sensor. For example, the stylus 210 can include a pen-shaped element constructed of plastic, metal, ceramic, or some other material that can slide easily across the tactile surface of the interface layer 110. The stylus 210 can include a tip configured to interface with any type of touchscreen (e.g., capacitive, resistive, FTIR). The stylus 210 preferably has a rigid tip (e.g., manufactured of polyoxymethylene) but may additionally or alternatively have any type of tip. Furthermore, the stylus 210 can be characterized by a tip diameter similar to that of a typical pen or pencil (e.g., 1.5 millimeters), thereby providing a similarly precise user-experience to drawing with the aforementioned traditional writing instruments. In one implementation, the coefficient of kinetic friction of the stylus 210 and the tactile surface of the interface layer 110 can be calibrated in order to adjust the scratch and/or dynamic coefficient of friction, thereby better approximating the scratch and/or dynamic coefficient of friction of a pen moving over a sheet of paper. Additionally or alternatively, the coefficient of static friction between the stylus tip and the tactile surface of the interface layer 110 can also be controlled to prevent stick-slip motion of the stylus tip across the film 100.

15. Touchscreen

In one implementation, the system 200 includes a touch-sensitive screen (i.e. a touchscreen): arranged across a bottom surface of the elastic layer 120; bonded to the elastic layer 120 via a layer of optically clear adhesive; and configured to detect the stylus tip at a distance substantially equal to a film thickness of the film 100. Thus, the system 200 can function to detect the tip of the stylus 210 upon contact of the stylus 210 with the tactile surface of the film 100, thereby enabling a mobile computing device to register writing inputs applied to the tactile surface of the film 100.

16. Manufacturing

Generally the film 100 can be manufactured according to a manufacturing method S100 executed by a manufacturing system 300 in order to imbue the film 100 with the durability characteristics and mutual elasticity described above. The manufacturing method S100 enables chemical crosslinking between the elastic layer 120 and the interface layer 110 that prevent separation of the two-layer film 100.

16.1 Mixing Prepolymer

Block S110 of the method S100 recites combining a prepolymer, a solvent, and a catalyst to define a viscous material. Generally, the manufacturing system 300 can dissolve one or more base components of the interface layer 110 (e.g., urethane prepolymer) with solvent (e.g., MEK) in Block S110 to form a viscous material (i.e., a liquid) of a particular viscosity configured to allow the viscous material to flow across and self-level on the elastic layer 120 within a prescribed period.

In one implementation, the manufacturing system 300 can mix the prepolymer, the solvent, and the catalyst within a mixing vessel and/or mixing head 310. As described below, the manufacturing system 300 can mix a TDI-terminated polyester prepolymer and a solvent, such as methyl ethyl ketone or cyclohexanone, to form a liquid viscous material. Additionally or alternatively, the manufacturing system 300 can heat the viscous material to dissolve the prepolymer. (The TDI-terminated polyester prepolymer can form a solid at ambient temperatures). The manufacturing system 300 can heat the prepolymer further and/or dilute the prepolymer with MEK and/or cyclohexanone to form the liquid viscous material of a viscosity (e.g., less than 3500 centipoise or "cP") desired for distribution through a slot-die as described below. In particular, the manufacturing system 300 can heat the prepolymer to a temperature at which the polymer and solvent are soluble (e.g., between seventy and a hundred degrees Celsius). In this implementation, the manufacturing system 300 can also define the viscous material to exhibit a viscosity such that, after distribution of the viscous material onto the elastic layer 120, the viscous material flows across the elastic layer 120 at a rate sufficient to facilitate self-leveling within a period of time and to limit formation of flow lines (i.e., lines that appear in the interface layer 110 after curing and indicate direction of flow of the viscous material across the elastic layer 120).

Similarly, the manufacturing system 300 can also mix curing agents, such as catalysts (e.g., dibutyltin dilaurate), chain extenders, and/or cross-linking agents with a solvent within a mixing vessel and/or mixing head 310. In one implementation, the manufacturing system 300 can heat the curing agent-solvent combination to facilitate dissolution of the curing agents. For example, a chain extender aromatic diamine curative for polyurethane can remain a liquid at room temperature (e.g., 35 degrees Celsius) while a cross-linking agent DiTMP remains a solid at room temperature. Therefore, the manufacturing system 300 can heat the aromatic diamine curative for polyurethane and DiTMP and combine with solvent (e.g., MEK) to a temperature at which DiTMP is soluble (e.g., greater than sixty degrees Celsius). As described below, the manufacturing system 300 (and/or operators of the manufacturing system 300) can select the catalyst, the cross-linking agent, and/or the chain extender to define a particular cure time, a particular percentage or rate of cross-linking of polymer chains, etc. Therefore, the manufacturing system 300 can select and mix catalysts, cross-linking agents, and/or chain extenders to generate a substantially transparent interface layer 110 exhibiting the aforementioned surface roughness, elastic modulus, and UV resistance.

The manufacturing system 300 can combine any combination of prepolymer, solvent, and/or curing agent (i.e., catalyst, cross-linking agent, and/or chain-extender). As described below, the manufacturing system 300 can combine components of the interface layer 110 to define a viscous material within the mixing head 310 including—by weight percentage of the viscous material as a whole— between sixty and ninety percent prepolymer; between two and four percent chain extender; between one and three percent cross-linking agent; between zero and 0.5 percent catalyst; and between five and thirty-five percent solvent.

Figure 6:
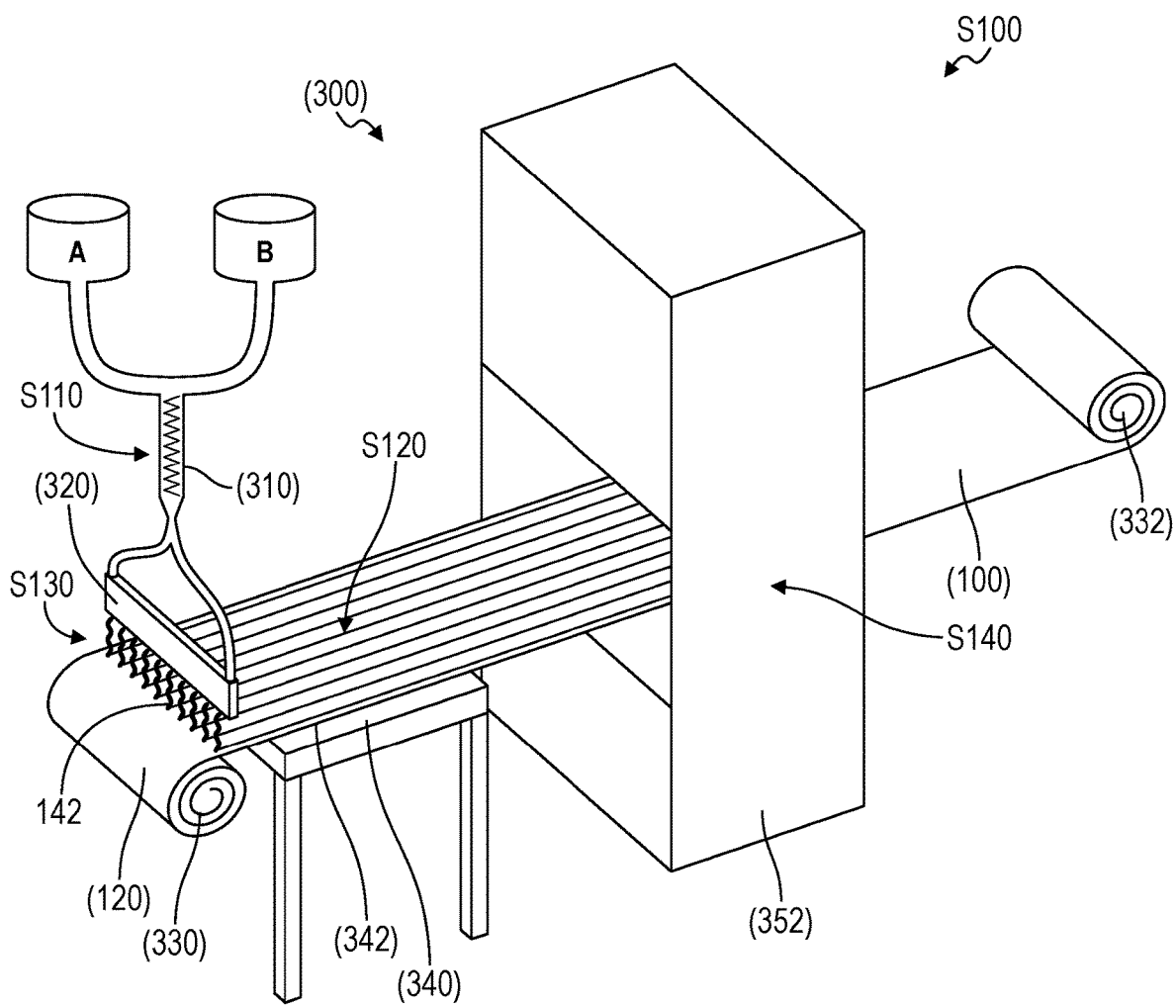
FIG. 6 is a schematic representation of a manufacturing method of the feedback-enhancing film.
Figure 7:
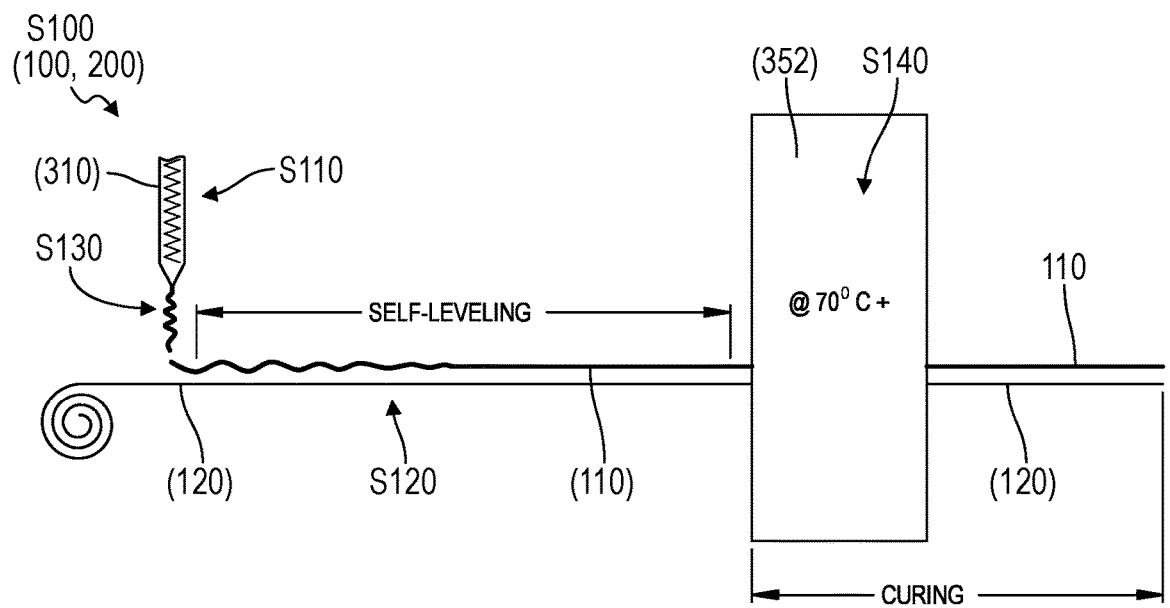
FIG. 7 is a schematic representation of a manufacturing method of the feedback-enhancing film.
Figure 8:
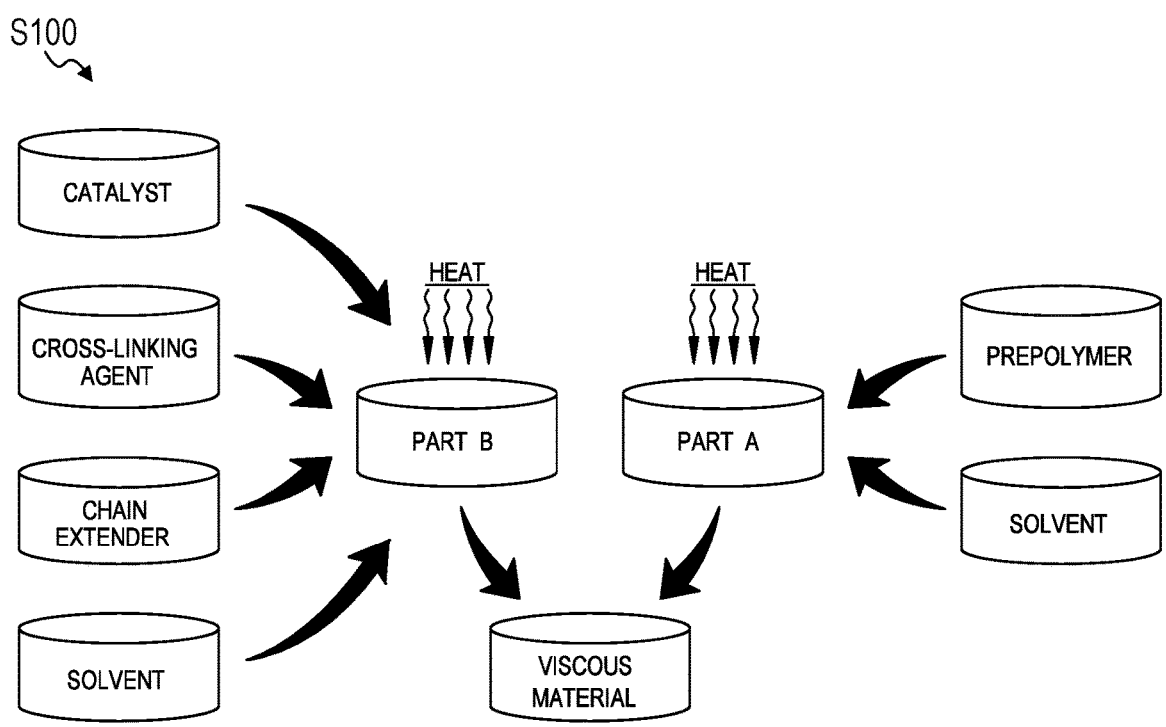
FIG. 8 is a flowchart representation of the manufacturing method of the feedback-enhancing film.

In another implementation shown in FIG. 6 and FIG. 8, the manufacturing system 300 can mix a prepolymer and solvent to form "Part A" and mix curing-agents to form "Part B", independently. The system can then combine Part A and Part B within a mixing head 310. In this implementation, the manufacturing system 300 can heat and/or add additional solvent to the viscous material of Part A and Part B. For example, the manufacturing system 300 can define a maximum allowable viscosity of combined components of the viscous material. Due to a difference in viscosities of Part A and Part B, the manufacturing system 300 can heat and/or add additional solvent to equilibrate viscosities of the (final) and define a viscous material with a viscosity remaining below a maximum allowable viscosity suitable for distribution through a slot-die coater 320. In particular, the manufacturing system 300 can measure viscosities of Part A and Part B and, in response to a viscosity of one of Part A and/or Part B exceeding a threshold viscosity, heat and/or add solvent to the appropriate viscous material.

Additionally or alternatively, to encourage mixing of components (i.e., Part A and Part B), the manufacturing system 300 can define a threshold (acceptable) deviation between viscosities of components of the viscous material. For example, the manufacturing system 300 can define a threshold deviation of viscosities of the components at twenty-percent deviation, such that the viscosity of Part A remains within twenty percent of the viscosity of Part B.

Once Part A and Part B are suitably mixed individually and/or dissolve, the manufacturing system 300 can combine Part A and Part B within a mixing head 310. For example, the manufacturing system 300 can store Part A and Part B individually in storage vessels. Then the manufacturing system 300 can subsequently meter each component from their respective storage vessel at a known flow rate into a mixing chamber. The manufacturing system 300 can then mix Part A with Part B within the mixing chamber. In this example, the manufacturing system 300 can include a static mixing head 310 with a series of crossing elements to create turbulence over which streams of Part A and Part B flow to induce mixing prior to a material forming process, such as slot-die coating.

In one variation, the manufacturing system 300 can select the solvent to react with the elastic layer 120 onto which the manufacturing system 300 casts the viscous material. In this variation, the solvent can be selected to dissolve a portion of the elastic layer 120 to improve adhesion (and promote cross-linking) between the elastic layer 120 and the interface layer 110 formed by casting the viscous material onto the elastic layer 120. In this variation the solvent can form a permanent bond between the interface layer 110 and the elastic layer 120, such that the elastic layer 120 cannot be easily removed from the interface layer 110 and therefore deforms with the interface layer 110 when writing force is applied to the film 100 via a stylus 210.

However, the manufacturing system 300 can mix any other component to form the interface layer 110 in any other suitable way.

16.2 Casting

As shown in FIG. 1A, Blocks S120 and S130 of the method S100 recite: advancing an elastic layer 120 from a first roll across a surface continuously at a first speed in Block S120; and depositing the viscous material through a deposition head at a first viscosity onto the elastic layer 120 in Block S130, the viscous material flowing laterally across the elastic layer 120 to form an interface layer 110 of substantially uniform thickness over the elastic layer 120 over a period of time while the elastic layer 120 advances along the surface. Generally, after mixing components of the interface layer 110 (e.g., prepolymer, solvent, catalyst, cross-linking agents, and/or chain extenders) into a viscous material within a mixing head 310, the manufacturing system 300 can cast or dispense the viscous material through a slot-die coater 320 or nozzle onto an elastic layer 120 advancing on the conveying system beneath the slot-die coater 320.

In particular, after component parts of the interface layer 110 are combined within a static mixing head 310 to define a liquid viscous material, a material forming processor can dispense the viscous material onto an elastic layer 120, on which the interface layer 110 can form. In this implementation, component materials of the viscous material enter the slot-die coater 320. Clamping components of the slot-die coater can apply pressure to the viscous material to conform with a particular shape. The clamping components then force the viscous material to flow out from an interstitial space between the clamping components onto an elastic layer 120 translating below the slot-die coater 320.

In the foregoing implementation, the manufacturing system 300 can include a conveyor and/or other component configured to translate an elastic layer 120 (e.g., PET and/or urethane) under the slot-die coater 320 to facilitate even and continuous distribution of viscous material across the elastic layer 120 during dispensation of the viscous material onto the elastic layer 120. The conveying system can be configured to unspool a roll of the elastic layer 120 and translate the elastic layer 120 over a surface, such as a mirror-finish or approximately flat and uniform plate.

The conveyor can cooperate with the slot-die coater 320 to translate—or otherwise progress—the elastic layer 120 to pass over a surface (e.g., a mirror-finish plate) underneath outflowing viscous material at a translation rate proportional to a flow rate of the viscous material dispensed through the slot-die coater 320 onto the elastic layer 120. Therefore, the slot-die coater 320 can deposit sufficient viscous material onto the elastic layer 120 to define a continuous layer of viscous material. Furthermore, the conveyor and the slot-die coater 320 can cooperate to determine thickness of the interface layer 110 (e.g., between five micrometers and seventy micrometers) as described below.

However, the manufacturing system 300 can deposit the viscous material onto the elastic layer 120 in any other suitable way.

16.3 Leveling

As shown in FIG. 3, Block S120 of the method recites: advancing an elastic layer 120 from a first roll 330 across a surface continuously at a first speed in Block S120. Generally, the conveyor can continue to translate the elastic layer 120 and the deposited viscous material over the surface (e.g., the mirror-finished plate described above) over a distance sufficient for the viscous material to flow to define a uniform thickness film distributed across the elastic layer 120.

As described above, the manufacturing system 300 can combine components of the viscous material of a viscosity sufficient to flow to uniform thickness across the elastic layer 120—laterally and/or longitudinally—within a period (e.g., one minute) corresponding to a distance between the deposition head and point of entry into a curing device. In one implementation, the manufacturing system 300 can access a known viscosity and/or measure a viscosity of the viscous material prior to dispensation from the slot-die coater 320 onto the elastic layer 120. Based on the viscosity of the viscous material, the manufacturing system 300 can define an approximate distance from dispensation of the viscous material until the viscous material levels across the elastic layer 120 to form the interface layer 110 of substantially uniform thickness. (The manufacturing system 300 can also include a vibratory and/or agitation module to facilitate self-leveling of the viscous material to form the interface layer 110.) For example, the manufacturing system 300 can cast the viscous material onto the elastic layer 120 (e.g., a continuous extruded elastomer film) translating a direction during deposition of the first viscous material. Following deposition of the viscous material, the first viscous material can flow across the continuous film elastic layer 120, such as through capillary action between the elastic layer 120 and the viscous material in order to form an interface layer 110 on top the elastic layer 120.

However, the manufacturing system 300 can facilitate self-leveling of the viscous material and uniform distribution of the viscous material across the elastic layer 120 by any other suitable means.

16.4 Curing

Block S140 of the method S100 recites, at a distance from the deposition head of the viscous material onto the elastic layer 120 corresponding to a duration of time for the viscous material to flow laterally across the elastic layer 120 to form the interface layer 110, heating the interface layer 110 to evaporate solvent from the interface layer 110 and to induce a reaction between the catalyst and the prepolymer to cure the interface layer 110 in Block S140. Generally, the manufacturing system 300 can implement Block S140 to heat the interface layer 110 in order to drive off excess solvent from the interface layer 110 and, therefore, facilitate curing of the interface layer 110 and formation of polymer cross-links desired for applications of the film 100.

In particular, the conveyor can translate the elastic layer 120 and the interface layer 110 of viscous material toward a curing device, such as an oven 352, an ultraviolet-curing oven, etc. However, the curing device can include any device capable of applying heat, ultraviolet radiation, a curing solution, and/or any combination thereof to cure the interface layer 110 to an initial cured state. The manufacturing system 300 can access properties of the viscous material, such as cure time and curing parameters, and desired curing level upon exit from the curing device (i.e., from a local database and/or remote lookup table) to calculate a duration and other curing parameters to output from the curing device to achieve a desired curing level (e.g. 50% cured, 75% cured, 100% cured). For example, the manufacturing system 300 can calculate the desired curing level of the interface layer 110 as 80% cured upon exiting the curing device. In this example, the manufacturing system 300 can perform additional processes and/or apply additional coatings (e.g., such as oleophobic coatings) following initial curing within the device—further down the manufacturing line. After these additional coatings and/or materials or other processes are applied to the interface layer 110, the manufacturing system 300 can fully cure the interface layer 110 (and additional coatings) to a final cured state (e.g., 100% cured).

In one implementation, the curing device can output conditions configured to evaporate approximately 90-95% of the solvent and, therefore facilitate curing of the interface layer 110. By removing the solvent to this extent, the manufacturing system 300 can induce reaction of components in the interface layer 110 and promote cross-linking between the polymers of the interface layer 110. Additionally, removal of the solvent also prevents bubble formation in the interface layer 110, thereby mitigating optical defects and/or aberrations formed at uncured regions of the interface layer 110, regions of unreacted prepolymer and/or catalyst, and/or regions of the interface layer 110 of non-uniform thickness.

In one example, the manufacturing system 300 can include a curing oven 352. The curing oven 352 can output heat over a time window and at a target temperature (e.g., 100 degrees Celsius) to evaporate solvent off the interface layer 110 and, therefore, facilitate reaction between the prepolymer and the curing agents. The oven can heat the film 100 to the temperature over a predetermined duration in order to yield a desired level of tackiness (or percent of uncured viscous material) of the interface layer 110 when the interface layer 110 exits the oven. In this example, the conveyor can cooperate with the curing oven 352 to progress the film 100 through the oven 352 during a time window corresponding to the duration defined for the film 100. In this example, the interface layer 110 can remain with the oven 352 for a longer duration to lessen tackiness of the interface layer 110 when the interface layer 110 exits the oven 352. Alternatively, the interface layer 110 can remain within the oven 352 for a shorter duration to increase tackiness of the interface layer 110 when the interface layer 110 exits the oven 352. Therefore, the conveyor and the oven 352 can cooperate to sufficiently cure the interface layer 110 to yield: a desired level of tackiness corresponding to a desired material performance and a sufficient curing level such that the manufacturing system 300 can spool the film 100 without sticking to itself when rolled.

In one variation, the manufacturing system 300 can define a final curing level for the interface layer 110 upon completion of all processes performed by the manufacturing system 300 (e.g., deposition, leveling, initial curing, and rolling onto a spool). In this variation, the interface layer 110 can be partially uncured at a time when the manufacturing system 300 spools the film 100—which includes the interface layer 110 and the elastic layer 120—onto a roll. The interface layer 110 can continue to cure on the roll after spooling.

However, the manufacturing system 300 can drive off solvent, induce polymerization of the prepolymer and cross-linking between polymers, and/or cure the interface layer 110 in any other suitable way.

16.5 Multiple Layers

In one variation, the manufacturing system 300 can execute the foregoing Blocks of the method S100 to produce the elastic layer 120 (e.g., over a removable backing) before a second iteration of the foregoing Blocks of the method S100 to deposit the interface layer 110 onto the partially cured elastic layer 120. In this variation, the manufacturing system 300 can tune chemical composition and curing parameters for each layer to control adhesion (and polymer cross-linking) between layers and define the film 100 that is resistant to impacts, deformable via a stylus 210, and optically clear. In particular, the manufacturing system 300 can first deposit a first viscous material of prepolymer, curing agents, and solvent onto an adhesive backing (e.g., a continuous elastomer film unspooled from a roll 330) and cure the first viscous material to define the elastic layer 120 on top of the adhesive backing as described above. After exiting the curing device, the manufacturing system 300 can translate the elastic layer 120 under a slot-die coater 320, which can deposit the interface layer 110 of the viscous material (or of another viscous material of prepolymer) onto the partially cured elastic layer 120.

In this implementation, the solvent of the viscous material deposited onto the first interface layer 110 can facilitate adhesion and/or cross-linking of polymers between layers of the film 100. Therefore, the interface layer 110 can be physically and chemically cross-linked with the elastic layer 120 in order to provide durability and mutual elasticity to the film 100.

16.5.1 Layer Texturing

One variation of the multilayer implementation of the method S100 includes texturing the upper surface of the elastic layer 120 to provide subsurface texture approximating a surface roughness of paper. As described above, the film 100 can approximate the grainy tactile feel caused by the surface roughness of paper by exhibiting a subsurface texture on the upper surface of the elastic layer 120. In one implementation the manufacturing system 300 includes a textured roller arranged along the conveyer behind the curing oven 352. The manufacturing system 300 can then apply a predetermined pressure to the textured roller thereby imprinting the (partially cured) elastic layer 120 with a texture. Alternatively, the manufacturing system 300 can apply a textured film to the surface of the elastic layer 120 after the elastic layer 120 has been partially cured. The elastic layer 120 can then cure over time, thereby receiving the texture of the textured film. However, the manufacturing system 300 can apply texture to the surface of the elastic layer 120 in any other way.

17. Composition Alternatives

As described above, the method S100 can be implemented to manufacture and process a film 100 that is durable, optically-clear, and elastic such that it mimics the previously described pen-on-paper feel, such as for application over a touchscreen 220. As described above the film 100 can exhibit properties such as specifically tuned elasticity (e.g., for the elastic layer 120 and the interface layer 110), high elastic recovery (for the elastic layer 120), durability (for the interface layer 110), optical clarity, and scratch resistance, which can result from chemical composition of the film and process parameters implemented by the manufacturing system 300 in Blocks of the method S100.

In one implementation, a primary base component of the film 100 is a prepolymer at an intermediate stage of polymerization. While in one implementation, the prepolymer includes TDI-terminated polyester prepolymer, other prepolymers can be mixed in combination with or in lieu of TDI-terminated polyester prepolymer. These additional or alternative prepolymers include: isocyanate containing prepolymers having low molecular weight; or isocyanate-containing polymers that contain aliphatic, aromatic, or isocyanate groups. The manufacturing system 300 can also implement other prepolymers, such as prepolymers with low concentrations of free isocyanates ("low free"). However, both conventional and "low free" materials can be utilized. Prepolymer backbones can include polyester, polyether, polycarbonate, polyacrylic, or mixtures thereof. (The prepolymer component can be an isocyanate-containing compound that will slowly react with water and other alcohols. The manufacturing system 300 can therefore pump a nitrogen gas blanket over the prepolymer and other solids in the viscous material to dry them prior to mixing with other components of the thin layer 140.)

The viscous material applied to the substrate 120 can also include a chain extender, such as an aromatic diamine curative for polyurethane. However, one or more other chain extenders can be applied to the viscous material in combination with or in lieu of the aromatic diamine curative for polyurethane, including classes of materials with small molecules and two isocyanate reactive end groups that include aliphatic amines, aromatic amines, and hydroxyls. In one implementation, the viscous material includes a combination of chain extenders or curatives to balance processing characteristics, such as pot life and tack time, and material performance characteristics of the interface layer 110, such as optical properties, UV resistance properties, elastic recovery, scratch resistance, and/or compressibility. Examples of chain extenders/curatives that can be used in the viscous materials of chain extenders include: ethylene glycol, diethylene glycol, 1,3 propanediol, 1,4 butanediol, 1,5 pentanediol, 1,6 hexanediol, aromatic diamine curative for polyurethane 90, aromatic diamine curative for polyurethane of various molecular weights (e.g., 100, or 300), polyoxypropylenediamine of various molecular weights (e.g., 230, 400, or 2000), Hydroquinone bis(2-Hydroxyethyl) or "HQEE", and/or ethoxylated HQEE.

The viscous material also includes a cross-linking agent, such as DiTMP. However, one or more other cross-linking agents can be mixed with DiTMP. For example, isocyanate reactive end groups include aliphatic amines, aromatic amines, and hydroxyls. In one implementation, the viscous material can contain a combination of cross-linking agents and chain extenders to balance processing characteristics, such as pot life and tack time, and material performance characteristics such as optical properties, UV resistance properties, elastic recovery, scratch resistance, and indentation/compressibility. Examples of these cross-linking agents include TMP, DiTMP, Ethoxylated TMP, Ethyoxylated DiTMP.

The viscous material also includes a catalyst (e.g., Dibutyltin dilaurate). However, other catalysts that exhibit snap cure capabilities include organo-metallic containing compounds with one or more of the following ligands: Sn, Ti, Zn, Hg, and/or Bi. Alternatively, catalysts can include an organic catalytic moiety, such as a tertiary amine (e.g., stannous octoate or dibutyltin dilaurate)

An appropriate snap-cure catalyst that is compatible with Part A and Part B can be selected such that Part A and Part B do not begin to react upon mixing in the static mixing head. Therefore, the manufacturing system can dispense the mixture through the mixing head and slot-die, and the mixture can self-level before curing begins. In this implementation, the manufacturing system can: 1) tune the non-catalyzed reactivity of the Part B mixture with isocyanate groups in Part A to minimize reaction and associated enthalpy of reaction at room temperature; 2) dilute the viscous material with solvent to reduce concentration of isocyanate and isocyanate-reactive groups; and/or 3) select a snap-cure catalyst that is inactive at temperatures below the drying/curing temperature of the viscous material.

In this implementation, the manufacturing system can combine a prepolymer, such as a TDI-terminated polyester prepolymer, a chain extender, such as an aromatic diamine curative for polyurethane, and a cross-linker, such as DiTMP to form the mixture that can be cast according to the method S100 for the elastomer layer 14. Once base components of the elastomer are thus selected, the manufacturing system can identify an appropriate amount—by weight or by volume—of each component to achieve an optimal composition mixture for forming a film layer with the appropriate optical properties, durability properties, and mechanical properties.

Once the base components of the elastomer are identified, the manufacturing system 300 can identify an appropriate amount (by weight or by volume) of each component to achieve an optimal composition viscous material for forming a film layer with the appropriate optical properties, durability properties, and mechanical properties.

The solvent can include an OH terminated chain extender, such as including diol chain extenders (e.g., butanediol or "BDO" or hydroquinone ether or "HQEE"). In the mixture of base components described above, a portion of the aromatic diamine curative for polyurethane component of the base components can be substituted with solvent since aromatic diamine curative may also function as a chain extender for polyurethane.

TDI-terminated polyester prepolymer typically forms 70%-86% of the composition of the film 100 whereas aromatic diamine curative for polyurethane, DiTMP, catalyst, and solvent form 2-2.9%, 1.5-2%, 0.1-0.2%, and 9-33%, respectively, of the film 100. In this implementation, the weighted percentage of the components can vary to achieve specific performances of the film 100 described below. Furthermore, the composition can also enhance or lengthen shelf-life stability of Part A and Part B (as described above) in viscous materials with solvent. For example, the manufacturing system can increase a volume of cross-linking agent within the viscous material to improve durability of the thin layer.

In another implementation, the manufacturing system 300 can replace or substitute a portion or all of the aromatic diamine curative for polyurethane chain extender with an OH terminated chain extender, such as BDO and/or HQEE, to increase pot life for the material composition. Thus, the manufacturing system 300 can vary a volume and a type of the OH terminated chain extender substituted into the material composition according to an amount of pot life desired for manufacturing a film using the material composition. For example, by substituting at least 50% of the aromatic diamine curative for polyurethane chain extender with 50% BDO or 50% HQEE, the manufacturing system 300 can extend the pot life by one minute (1 min.) or eight minutes (8 min.), respectively. In another example, by replacing the aromatic diamine curative for polyurethane component with a diol chain extender, such as BDO or HQEE, the manufacturing system 300 can extend the pot life of the material composition by thirty minutes (30 min.) or by more than sixty minutes (60 min.).

The manufacturing system 300 can then add the chain extender to the prepolymer component at one or more times during manufacture. For example, the manufacturing system 300 can add the chain extender at the outset of the mixing of the base components of the viscous material in order to aid in the dissolution of one or more of the base components, including the prepolymer. Alternatively or additionally, the manufacturing system 300 can add the chain extender composition continuously throughout one or more aspects of manufacture of the material to control the dissolution and viscous material of the base components. Additionally or alternatively, amounts of the chain extender can be added at a first time (e.g., before mixing for purposes of dissolving the prepolymer, etc.) and at a second time to enhance the dissolution of the composition materials prior to a slot-die coating.

The film 100 can include an interface layer 110 and an elastic layer 120 that are fabricated to achieve desired material properties. Examples of materials that may be used in the film 100 include urethanes, ureas, olefins, polyesters, plasticized polyvinyl chloride, polyesters (e.g., polyethylene terephthalate (PET) and/or polyethylene naphthalate (PEN)), polycarbonate, acrylic, silicones etc. Additionally, the layers of the film 100 can include different types of urethanes, such as those based on aromatic or aliphatic isocyantes and urethanes based on ether, ester, carbonate, or acrylic polyols. In one example, the interface layer 110 includes self-healing material (e.g., self-healing urethane) that enable the layer 110 to be soft while still proving resistant to abrasion, wherein the self-healing polyurethane has an acrylic backbone instead of a typical polyol backbone, thereby increasing its durometer.

Variants of the film 100 can exhibit tuned material properties varying the crosslinking density within the layers. A layer with a high-crosslinking density exhibits decreased flexibility, increased modulus, increased hardness, and increased melting point. Conversely, a layer with a lower crosslinking density exhibits increased flexibility, decreased modulus, decreased hardness, and decreased melting point. Thus, by tuning the crosslink densities for each layer, the film 100 can converge to the aforementioned desired material properties. In addition to crosslinking density, the same type of variable mechanical property gradient can be achieved by varying the amount of an inorganic filler such as nanoparticles, nanorods, etc. A high filler content may correspond to a high modulus, etc.

Furthermore, the crosslinking density and/or filler variance can vary as function of depth within a layer of the film 100 to achieve desired elasticity and/or texture characteristics.

Similar strategies to those used to vary crosslink density may additionally or alternatively be used to generate layers with customized shear properties (e.g., by varying the amount of curing agent present in a polymer as a function of depth).

As a person skilled in the art will recognize from the previous detailed description and from the figures and claims, modifications and changes can be made to the embodiments of the invention without departing from the scope of this invention as defined in the following claims.

We claim:

1. A feedback-enhancing film comprising:
   an elastic layer, comprising a first polymer exhibiting optical transparency, bulk elasticity, and a first elastic recovery rate;
   an interface layer arranged across an upper surface of the elastic layer comprising a second polymer exhibiting optical transparency, impact resistance, UV resistance, smoothness to touch, and a second elastic recovery rate, the second elastic recovery rate less than the first elastic recovery rate; and
   wherein, in response to an application of a first writing force via a stylus tip, the interface layer and the elastic layer mutually deform to exhibit a first dynamic coefficient of friction substantially similar to a second dynamic coefficient of friction exhibited by paper in response to an application of the first writing force via a pen.

2. The feedback-enhancing film of claim 1, wherein the interface layer and the elastic layer exhibit elastic deformation greater than 10% engineering strain of the interface layer and the elastic layer when a writing force is applied to the interface layer and the elastic layer via the stylus tip.

3. The feedback-enhancing film of claim 1, wherein the first elastic recovery rate and the second elastic recovery rate is characterized by a peak tan delta ratio less than 2.5.

4. The feedback-enhancing film of claim 1, wherein the interface layer and the elastic layer exhibit the first dynamic coefficient of friction between 0.2 and 0.3.

5. The feedback-enhancing film of claim 4, wherein the interface layer and the elastic layer exhibit the first dynamic coefficient of friction between 0.20 and 0.23 in response to the application of the first writing force of 1.0 Newtons and exhibit a second dynamic coefficient of friction between 0.22 and 0.28 in response to an application of a second writing force of 3.0 Newtons.

6. The feedback-enhancing film of claim 4, wherein the interface layer and the elastic layer exhibit the first dynamic coefficient of friction between 0.2 and 0.3 in response to the application of the first writing force via a 1.5-millimeter stylus tip across the interface layer.

7. The feedback-enhancing film of claim 1, wherein the elastic layer comprising the first polymer is chemically crosslinked with the interface layer comprising the second polymer at the upper surface of the elastic layer.

8. The feedback-enhancing film of claim 7, wherein the elastic layer comprising the first polymer is chemically crosslinked with the interface layer comprising the second polymer by:
   combining a prepolymer, a solvent, a cross-linking agent, and a chain extender to define a viscous material;
   advancing the elastic layer;
   depositing the viscous material through a deposition head across the elastic layer, the viscous material flowing across the elastic layer to form a thin layer of substantially uniform thickness; and
   heating the thin layer and the elastic layer to initiate polymerization of the thin layer into the interface layer and crosslinking between the interface layer and the elastic layer.

9. The feedback enhancing film of claim 1, wherein:
   the first polymer comprises polyurethane; and
   the second polymer comprises self-healing acrylic polyurethane.

10. The feedback-enhancing film of claim 1, further comprising a distribution of microparticles comprised of a hard polymer suspended within the interface layer, the microparticles characterized by optical transparency.

11. The feedback-enhancing film of claim 1:
   wherein the elastic layer defines a continuous layer; and
   wherein the interface layer defines a set of discontinuous regions across the elastic layer.

12. The feedback-enhancing film of claim 11, wherein each discontinuous region in the set of discontinuous regions:
   spans an area less than 1 square millimeter; and
   is separated from an adjacent discontinuous region by a distance greater than 10 micrometers.

13. The feedback-enhancing film of claim 1, wherein the elastic layer comprises a textured upper surface approximating the surface roughness of paper.

14. A system for enhancing writing feedback comprising:
   a stylus comprising a stylus tip; and
   a film comprising:
      an elastic layer, comprising a first polymer exhibiting optical transparency and bulk elasticity;
      an interface layer arranged across an upper surface of the elastic layer comprising a second polymer exhibiting optical transparency, abrasion resistance, impact resistance, UV resistance, and smoothness to touch;
      a distribution of microparticles comprised of a hard polymer suspended within the interface layer, the microparticles characterized by optical transparency and an average distance between adjacent microparticles less than a diameter of the stylus tip; and
      wherein the interface layer and the elastic layer mutually deform to resist transverse movement of the stylus tip across the interface layer in response to an application of writing force to the interface layer via the stylus tip.

15. The system of claim 14, wherein:
the first polymer comprises polyurethane;
the second polymer comprises self-healing acrylic polyurethane; and
the stylus tip comprises polyoxymethylene.

16. A system for enhancing writing feedback comprising:
a stylus comprising a stylus tip;
a film comprising:
- an elastic layer, comprising a first polymer exhibiting optical transparency and bulk elasticity;
- an interface layer arranged across an upper surface of the elastic layer comprising a second polymer exhibiting optical transparency, abrasion resistance, impact resistance, UV resistance, and smoothness to touch; and
- wherein the interface layer and the elastic layer mutually deform to resist transverse movement of the stylus tip across the interface layer in response to an application of writing force to the interface layer via the stylus tip; and a touch sensitive display:
- arranged across a bottom surface of the elastic layer;
- bonded to the elastic layer via a layer of optically clear adhesive; and
- configured to detect the stylus tip at a distance substantially equal to a film thickness of the film.

17. The system of claim 16, wherein:
the first polymer comprises polyurethane;
the second polymer comprises self-healing acrylic polyurethane; and
the stylus tip comprises polyoxymethylene.

18. A system for enhancing writing feedback comprising:
a stylus comprising a stylus tip; and
a film comprising:
- an elastic layer, comprising a first polymer exhibiting optical transparency and bulk elasticity;
- an interface layer arranged across an upper surface of the elastic layer comprising a second polymer exhibiting optical transparency, abrasion resistance, impact resistance, UV resistance, and smoothness to touch; and
- wherein the interface layer and the elastic layer mutually deform to resist transverse movement of the stylus tip across the interface layer in response to an application of writing force to the interface layer via the stylus tip; and wherein the film defines a film thickness between 50 micrometers and 200 micrometers and the elastic layer defines a thickness between two and three times a thickness of the interface layer.

19. The system of claim 18, wherein:
the first polymer comprises polyurethane;
the second polymer comprises self-healing acrylic polyurethane; and
the stylus tip comprises polyoxymethylene.

* * * * *